(12) United States Patent
Ohta et al.

(10) Patent No.: US 7,529,861 B2
(45) Date of Patent: May 5, 2009

(54) PERIPHERAL SWITCHING DEVICE AND A PERIPHERAL SWITCHING CONTROL DEVICE

(75) Inventors: Ken Ohta, Yokohama (JP); Takehiro Nakayama, Yokohama (JP); Yu Inamura, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 44 days.

(21) Appl. No.: 11/828,013

(22) Filed: Jul. 25, 2007

(65) Prior Publication Data

US 2008/0177905 A1    Jul. 24, 2008

(30) Foreign Application Priority Data

Jul. 25, 2006   (JP)   ............................. P2006-202596
Jun. 28, 2007   (JP)   ............................. P2007-171096

(51) Int. Cl.
G06F 3/00   (2006.01)
G06F 13/00  (2006.01)

(52) U.S. Cl. ............................. 710/8; 710/107; 710/240

(58) Field of Classification Search ......... 710/107–117, 710/120–124, 240–244

See application file for complete search history.

(56) References Cited

U.S. PATENT DOCUMENTS

| | | | |
|---|---|---|---|
| 5,063,496 A * | 11/1991 | Dayan et al. ................... 726/27 |
| 6,151,684 A * | 11/2000 | Alexander et al. ............. 714/4 |
| 6,496,847 B1 | 12/2002 | Bugnion et al. |
| 6,704,819 B1 * | 3/2004 | Chrysanthakopoulos .... 710/240 |
| 6,732,289 B1 * | 5/2004 | Talagala et al. ................ 714/6 |
| 6,915,367 B2 * | 7/2005 | Gary et al. .................... 710/244 |
| 7,069,365 B2 * | 6/2006 | Zatorski ...................... 710/200 |
| 7,370,248 B2 * | 5/2008 | Tapper et al. ................ 714/718 |
| 2004/0088459 A1 * | 5/2004 | Gary et al. .................... 710/244 |
| 2004/0181601 A1 * | 9/2004 | Sakthikumar ............... 709/229 |
| 2004/0199607 A1 * | 10/2004 | Reger et al. .................. 709/219 |
| 2005/0114616 A1 | 5/2005 | Tune et al. |

FOREIGN PATENT DOCUMENTS

| | | |
|---|---|---|
| JP | 7-139691 | 12/1995 |
| JP | 2804478 | 7/1998 |
| JP | 11-149385 | 6/1999 |
| JP | 2001-306339 | 11/2001 |
| JP | 2003-196151 | 7/2003 |
| JP | 2005-100264 | 4/2005 |
| JP | 2005-129034 | 5/2005 |
| JP | 3687750 | 6/2005 |

* cited by examiner

*Primary Examiner*—Christopher B Shin
(74) *Attorney, Agent, or Firm*—Oblon, Spivak, McClelland, Maier & Neustadt, P.C.

(57) ABSTRACT

A peripheral switching device includes an ownership switch request receiver unit configured to receive an ownership switch request for requesting to assign a peripheral to an operating system; an ownership request holding unit configured to receive and hold an ownership request for requesting to ensure or release an ownership of a peripheral to an operating system; a switching judgment unit configured to judge whether or not to execute an assignment of a peripheral to an operating system, in accordance with the ownership switch request and the ownership request; and a switching execution unit configured to execute the assignment of the peripheral to the operating system, in accordance with the judgment result.

13 Claims, 11 Drawing Sheets

LOCK MANAGEMENT TABLE (PERIPHERAL SWITCHING DEVICE)

| BIT | PERIPHERAL TYPE | OS IDENTIFICATION | PRIORITY | TIMESTAMP |
|---|---|---|---|---|
| 0 | LCD | 0 | 0 | |
| 1 | KEYPAD | 0 | 0 | |
| 2 | SPEAKER | 0 | 0 | |
| 3 | MICROPHONE | 1 | 1 | T1 |
| 4 | WiFi | 0 | 0 | |
| 5 | CAMERA | 0 | 0 | |

FIG. 5A

FORMAT OF OWNERSHIP REQUEST

OWNERSHIP REQUEST = (PERIPHERAL SWITCHING PROHIBITION BIT STRING, LOCK REQUEST PRIORITY STRING)

FIG. 5B

PERIPHERAL SWITCHING PROHIBITION BIT STRING

| BIT | PERIPHERAL TYPE |
|---|---|
| 0 | LCD |
| 1 | KEYPAD |
| 2 | SPEAKER |
| 3 | MICROPHONE |
| 4 | WiFi |
| 5 | CAMERA |
| 6 | NOT IN USE |
| 7 | NOT IN USE |

FIG. 6A  PERIPHERAL OWNERSHIP TABLE
(PERIPHERAL SWITCHING DEVICE)

| NUMBER | PERIPHERAL TYPE | OS IDENTIFICATION |
|---|---|---|
| 0 | LCD | 1 |
| 1 | KEYPAD | 1 |
| 2 | SPEAKER | 1 |
| 3 | MICROPHONE | 1 |
| 4 | WiFi | 1 |
| 5 | CAMERA | 1 |

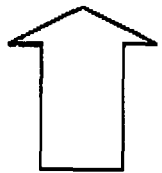

| NUMBER | PERIPHERAL TYPE | OS IDENTIFICATION |
|---|---|---|
| 0 | LCD | 2 |
| 1 | KEYPAD | 2 |
| 2 | SPEAKER | 2 |
| 3 | MICROPHONE | 2 |
| 4 | WiFi | 2 |
| 5 | CAMERA | 2 |

FIG. 6B  PERIPHERAL OWNERSHIP TABLE
(PERIPHERAL SWITCHING DEVICE)

| NUMBER | PERIPHERAL TYPE | OS IDENTIFICATION |
|---|---|---|
| 0 | LCD | 1 |
| 1 | KEYPAD | 1 |
| 2 | SPEAKER | 1 |
| 3 | MICROPHONE | 1 |
| 4 | WiFi | 1 |
| 5 | CAMERA | 1 |

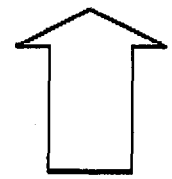

| NUMBER | PERIPHERAL TYPE | OS IDENTIFICATION |
|---|---|---|
| 0 | LCD | 2 |
| 1 | KEYPAD | 2 |
| 2 | SPEAKER | 2 |
| 3 | MICROPHONE | 1 |
| 4 | WiFi | 2 |
| 5 | CAMERA | 2 |

FIG. 7

FORMAT OF OWNERSHIP LOCK REQUEST

| OWNERSHIP LOCK REQUEST = (PERIPHERAL SWITCHING PROHIBITION BIT STRING, LOCK REQUEST PRIORITY STRING) |
|---|

FIG. 8

LOCK STATUS MANAGEMENT TABLE
(PERIPHERAL SWITCHING CONTROL DEVICE)

| IDENTIFICATION OF REQUESTING SOURCE | PRIORITY | PERIPHERAL TYPE | TIMESTAMP |
|---|---|---|---|
| ID0 | 1 | MICROPHONE, SPEAKER | T0 |
| ID1 | 3 | SPEAKER | T1 |
| ID3 | 2 | LCD, KEYPAD | T3 |

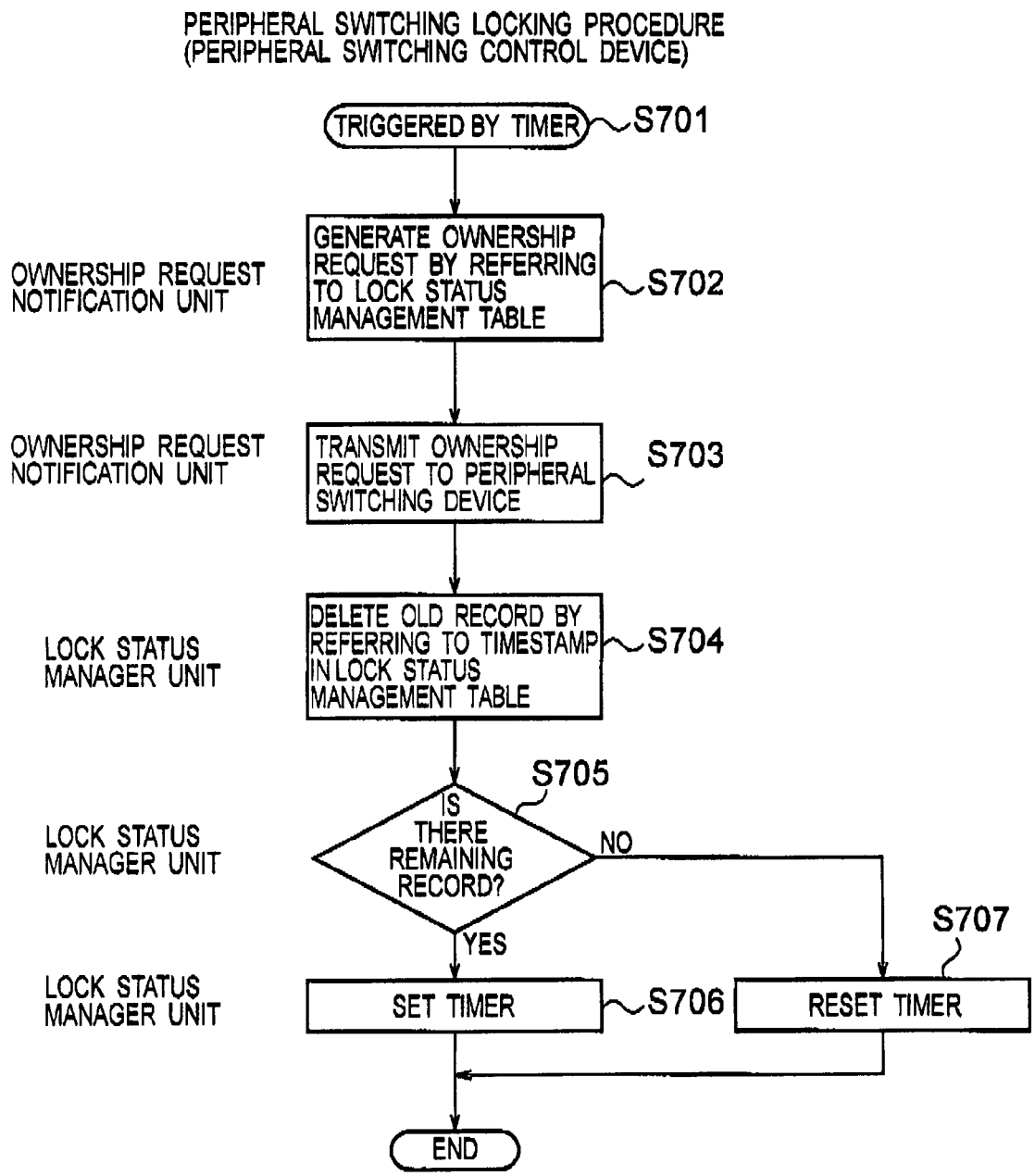

PERIPHERAL SWITCHING DEVICE AND A PERIPHERAL SWITCHING CONTROL DEVICE

CROSS REFERENCE TO RELATED APPLICATION

This application is based upon and claims the benefit of priority from the prior Japanese Patent Applications No. 2006-202596 filed on Jul. 25, 2006, and P2007-171096 filed on Jun. 28, 2007; the entire contents of which are incorporated herein by reference.

And, the entire contents of the U.S. Pat. No. 6,496,847 which are incorporated herein by reference.

BACKGROUND OF THE INVENTION

1. Field of the Invention

The present invention relates to a peripheral switching device configured to switch an ownership of a peripheral between a plurality of operating systems that concurrently operate on a computer system.

And, the present invention relates to a peripheral switching control device provided for each of a plurality of operating systems in a computer system including the peripheral switching device.

2. Description of the Related Art

In recent years, software such as the "Xen" and the "VMWare" has been developed and provided as a technique of a virtual machine monitor allowing multiple virtual machine environments to be implemented on one computer system.

Such a virtual machine monitor technique enables multiple operating systems (abbreviated as OSs below) having different purposes such as for private use and business use or for system use and end-user use, to concurrently operate on a single terminal (a computer system) such as a mobile phone or a PC. Further, this technique enables different types of OSs such as "Linux (registered trademark)" and "Windows Mobile (registered trademark)", to concurrently operate on the single terminal.

When a user uses these multiple OSs while switching the OSs between foreground and background, it is necessary to switch the ownership of a peripheral such as an LCD (liquid crystal display), a keypad, a mouse, a speaker and a microphone to the foreground OS.

U.S. Pat. No. 6,496,847 discloses a technique for sharing peripherals between a host OS and a guest OS.

When a user presses a switch button for switching between a foreground OS and a background OS, or when a user selects a window corresponding to the background OS, use of this technique allows the background OS to be set to the foreground, and also peripherals such as an input device and a display device to be assigned to the newly-set foreground OS.

In addition, with this technique, it is also possible to perform mixing of audio outputs from the foreground OS and the background OS.

However, the foregoing conventional technique is not provided with means for prohibiting (locking) switching of the ownership of a certain peripheral between OSs and means for flexibly arbitrating peripheral contention between OSs. For this reason, with the conventional technique, it is difficult to secure quality of important services such as a telephone.

Moreover, the conventional technique has a problem of uselessly consuming resources when a peripheral shared by multiple OSs is set to off by one of the OSs, because the other OS keeps on attempting to communicate with the peripheral without being aware that the peripheral has been set to off. This useless resource consumption is caused by a lack of controller for stopping the other OS from making communications for input-output with the peripheral.

To be more precise, a computer system configured to switch the ownership of a peripheral among concurrently operating multiple OSs sometimes confronts a case where the switching of the ownership of a peripheral between the OSs must not be executed, even when a user or an application requests to switch the ownership of the peripheral to the OS. The conventional technique, however, does not support such a case.

Here, consider cases, as examples, where an ownership of a peripheral is switched to background OS, in order to display an e-mail incoming to the background OS, and where an ownership of a peripheral is switched to background OS, because a user presses the aforementioned switch button in order to use a function provided to the background OS.

One possible case may occur under a condition in which a telephone application on the foreground OS is currently used for telephone conversations. More precisely, under this condition, it is desirable to maintain the current foreground OS as the OS to which a microphone and a speaker are assigned, even though it does not matter to switch the OS to which an LCD and a keypad are assigned to background OS.

If the OS to which the microphone and the speaker are assigned is switched to background OS under the conditions in which the telephone application is currently used for telephone conversations, a problem occurs that the call through the telephone application is disrupted.

As another example of the cases where it is desirable to prohibit (lock) the switching of the ownership of a peripheral between OSs, there is a case where the background OS detects a fault or anomaly in the foreground OS, whereby the switching of the OSs between foreground OS and background OS is forcibly performed. In this case, even when the OS having the fault or anomaly requests to switch the ownership of a peripheral, it is desirable not to switch the ownership of the peripheral.

Unless the switching of the OSs between foreground OS and background OS is forcibly performed, the OS having the faulty or anomaly shows a faulty screen on the LCD to the user, and thereby the user may be bewildered.

In addition, if a peripheral is assigned to the OS having the faulty or anomaly, the user unavoidably operates on the OS having the faulty or anomaly. As a result, inappropriate processing may be performed.

On the other hand, if the ownership of the microphone and the speaker is controlled separately from the aforementioned switch button, a problem of a contention for the peripheral between the OSs has occurred.

When there is an incoming call to the background OS while a speech recognition application owns and uses the microphone on the foreground OS, there is a possibility that it is impossible to execute a telephone call operation in response to the incoming call, because the foreground OS uses the microphone exclusively.

This possibility cannot be avoided only by simply giving higher priority for the microphone to the background OS than the foreground OS. Specifically, when there is an incoming call to the foregoing OS while a speech recognition application owns and uses the microphone on the background OS, it may be also impossible to perform a telephone call operation in response to the incoming call.

Even when the priority of a first OS is set higher or lower than that of a second OS in an environment where the two OSs are installed, the same problem still exists.

In addition, this computer system may have a case where, when a peripheral shared by the OSs is set to off by one of the OSs, it is desirable that the other OS should stopping data communications for input-output with the peripheral.

For example, when the foreground OS sets a shared speaker to off by setting a manner mode even while music is being played on the background OS, the speaker also stops the output of audio data from the background OS.

However, the background OS continues to transfer the audio data to the speaker without being aware that the speaker is set to off. In this way, resources may be consumed in vain in some cases.

BRIEF SUMMARY OF THE INVENTION

The present invention has been made in consideration of the aforementioned background. An object of the present invention is to provide a peripheral switching device and a peripheral switching control device capable of implementing a means for prohibiting (locking) switching of an ownership of a certain peripheral between OSs, and a means for flexibly solving a contention for a peripheral between the OSs.

Moreover, another object of the present invention is to provide a peripheral switching device and a peripheral switching control device capable of implementing a means for controlling so that, when a peripheral shared by OSs is set to off by one of the OSs, the other OS would be stopped from making data communications for input-output with the peripheral.

A first aspect of the present invention is summarized as a peripheral switching device configured to switch an ownership of a peripheral between a plurality of operating systems that concurrently operate in a computer system, including: an ownership switch request receiver unit configured to receive an ownership switch request for requesting to assign a peripheral to an operating system; an ownership request holding unit configured to receive and hold an ownership request for requesting to ensure or release an ownership of a peripheral to an operating system; a switching judgment unit configured to judge whether or not to execute an assignment of a peripheral to an operating system, in accordance with the ownership switch request and the ownership request; and a switching execution unit configured to execute the assignment of the peripheral to the operating system, in accordance with the judgment result.

In the first aspect, the switching judgment unit can be configured to judge whether or not to execute the assignment of the peripheral to the operating system designated by the ownership switch request, in accordance with a priority included in at least any one of the ownership switch request and the ownership request.

In the first aspect, the ownership request holding unit can be configured to replace the held ownership request with a new ownership request including a higher priority than a priority included in the held ownership request, when the new ownership request is received, and the switching judgment unit can be configured to judge whether or not to execute the assignment of the peripheral to the operating system designated by the new ownership request, when the held ownership request is replaced with the new ownership request.

In the first aspect, the priority of any of the ownership switch request and the ownership request can be determined in accordance with a status of software on the operating system.

In the first aspect, the peripheral switching device can further include a peripheral setting unit configured to notify setting information of a peripheral to an operating systems to which the peripheral is assigned, when a setting of the peripheral is changed from an on-setting to an off-setting or from the off-setting to the on-setting.

In the first aspect, the ownership request holding unit can be configured to delete the ownership request which has been held over a predetermined time period after the ownership request was received or updated.

In the first aspect, the switching judgment unit can be configured to judge whether or not to execute the assignment of the peripheral to the operating system designated by the ownership switch request, in accordance with the status information included in the ownership request and the status information included in the ownership switch request.

A second aspect of the present invention is summarized as a peripheral switching control device provided for each of a plurality of operating systems in a computer system comprising a peripheral switching device configured to switch an ownership of a peripheral between the plurality of operating systems that concurrently operate, including: an ownership lock request receiver unit configured to receive an ownership lock request including a request to prohibit switching of an ownership of a peripheral between the operating systems or to release the prohibition, and a priority given to the request; and an ownership request notification unit configured to notify, to the peripheral switching device, an ownership request including a request to ensure or release the ownership of the peripheral to the operating system, and a priority given to the request, based on the received ownership lock request.

In the second aspect, the peripheral switching control device can further include a peripheral setting notification unit configured to receive setting information of a peripheral transmitted by the peripheral switching device, and to determine the permission or restriction of an input-output operation of the operating system under the control of the peripheral switching control device to the peripheral based on the setting information.

In the second aspect, the peripheral switching control device can further include: an ownership switch request receiver unit configured to receive an ownership switch request for requesting to assign a peripheral to an operating system; and an ownership switch request data notification unit configured to notify the ownership switch request to the peripheral switching device.

In the second aspect, the peripheral switching control device can further include: a lock status manager unit configured to manage a lock status which associates a prohibition status in which switching of an ownership of a peripheral between the operating systems is prohibited, with a timestamp indicating a time when the prohibition status is set, to update the lock status in response to the ownership lock request, and to invalidate the prohibition status which has been held over a predetermined time period; and an ownership request notification unit configured to notify an ownership request for requesting to ensure or release the ownership of the peripheral to the operating system, to the peripheral switching device, in accordance with the lock status, in a certain periods.

In the second aspect, the peripheral switching control device can further include an activity notification unit configured to notify the peripheral switching device that the peripheral switching control device normally operates, in certain periods.

In the second aspect, the lock status manager unit can be configured to further associate, as the lock status of each peripheral, identification of a requesting source which issues the ownership lock request for requesting to prohibit switching of the ownership of the peripheral between the operating systems, with the prohibition status and the timestamp.

BRIEF DESCRIPTION OF THE SEVERAL VIEWS OF THE DRAWINGS

FIGS. 5A and 5B are diagrams showing an example of a format of an ownership request.

FIGS. 6A and 6B are diagrams each showing an example of a peripheral ownership table managed by a switching judgment unit of the peripheral switching device according to the first embodiment of the present invention.

FIG. 7 is a diagram showing an example of a format of an ownership lock request.

FIG. 8 is a diagram showing an example of a lock status management table managed by a lock status manager unit of the peripheral switching control device according to the first embodiment of the present invention.

FIG. 15 is a flow chart showing a peripheral switching locking procedure in the peripheral switching control device according to a modified example 1 of the present invention.

DETAILED DESCRIPTION OF THE INVENTION

Configuration of Computer System According to First Embodiment of the Invention

A configuration of a computer system according to a first embodiment of the present invention will be described by referring FIGS. 1 to 8.

In a computer system 1 according to this embodiment, mounted are a peripheral switching device and peripheral switching control devices that are configured to perform switching of an ownership of a peripheral between multiple OSs, which concurrently operate.

Here, as the means for causing the multiple OSs to concurrently operate on the computer system, a virtual machine monitor technique based on software such as "VMWare" or "Xen" may be used, or a virtual technique based on hardware such as "ARM TrustZone" may be used.

Alternatively, in the hardware, such as a multi-CPU system or a multi-core system, on which the multiple CPUs operate, it is possible to operate the multiple OSs concurrently and individually in each of CPUs.

The following description of the first embodiment is based on the assumption that the virtual machine monitor technique based on software is employed as the means for concurrently operating multiple OSs in a computer system.

Figure 1:
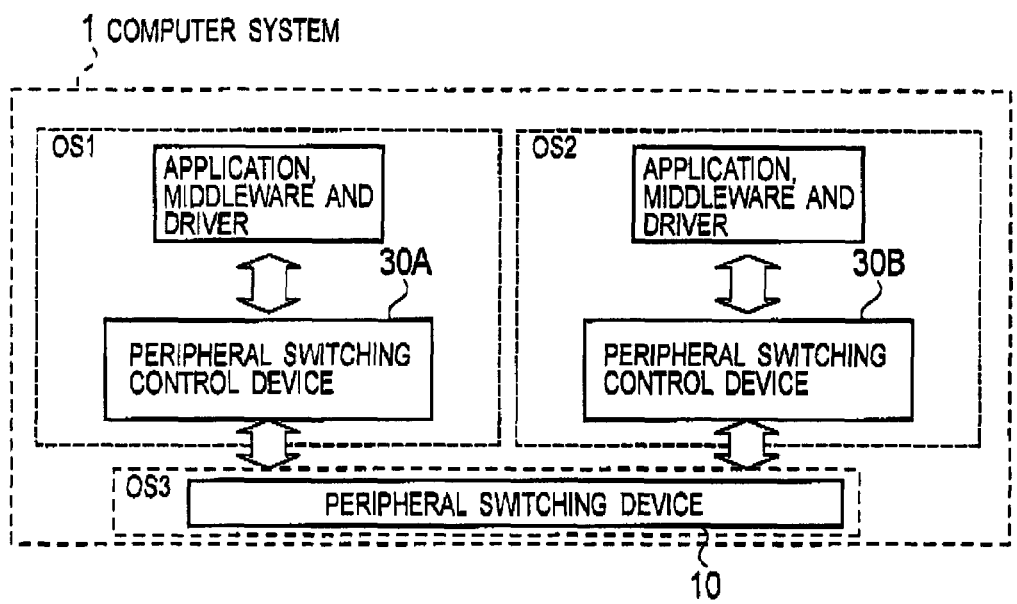
FIG. 1 is a configuration diagram of a computer system according to a first embodiment of the present invention.

AS shown in FIG. 1, in the computer system 1 according to this embodiment, a peripheral switching control device 30A is provided on a first OS (OS1) in the computer system 1, a peripheral switching control device 30B is provided on a second OS (OS2) in the computer system 1, and a peripheral switching device 10 configured to switch an ownership of an peripheral between the OS1 and the OS2 is provided on a third OS (OS3).

Moreover, a real device driver for accessing an actual peripheral is provided on the OS3, while virtual device drivers are provided on the OS1 and the OS2.

The peripheral switching device 10 controls the ownership of the peripheral to the OS1 or the OS2, by switching the connection with the real device driver between the virtual device drivers.

For example, the peripheral switching device 10 controls the ownership of the peripheral to the OS1 or the OS2, by using various methods such as by changing the address of a buffer used by the real device driver to an address corresponding to any one of the virtual device drivers of the OS1 and the OS2, and by performing by itself a relay process and a process of switching the ownership of the peripheral between the virtual device drivers and the real device driver.

The OS1 and the OS2 perform input-output operations to the respective virtual device drivers when using the peripheral.

For example, when the OS1 outputs certain data to a virtual device driver corresponding to a certain peripheral in order to operate the peripheral, and if the peripheral is currently assigned to the OS1 by the peripheral switching device 10, the data are outputted to the real device driver.

On the other hand, if the peripheral is currently assigned to the OS2 by the peripheral switching device 10, the data are not passed to the real device driver. In this case, an error is returned to the virtual device driver if such a function is implemented in the computer system 1.

Here, the switching of the ownership of the peripheral is performed between the OS1 and the OS2. When the OS1 is a foreground OS, the background OS is the OS2. In contrast, when the foreground OS is the OS2, the OS is the background OS.

Figure 2:
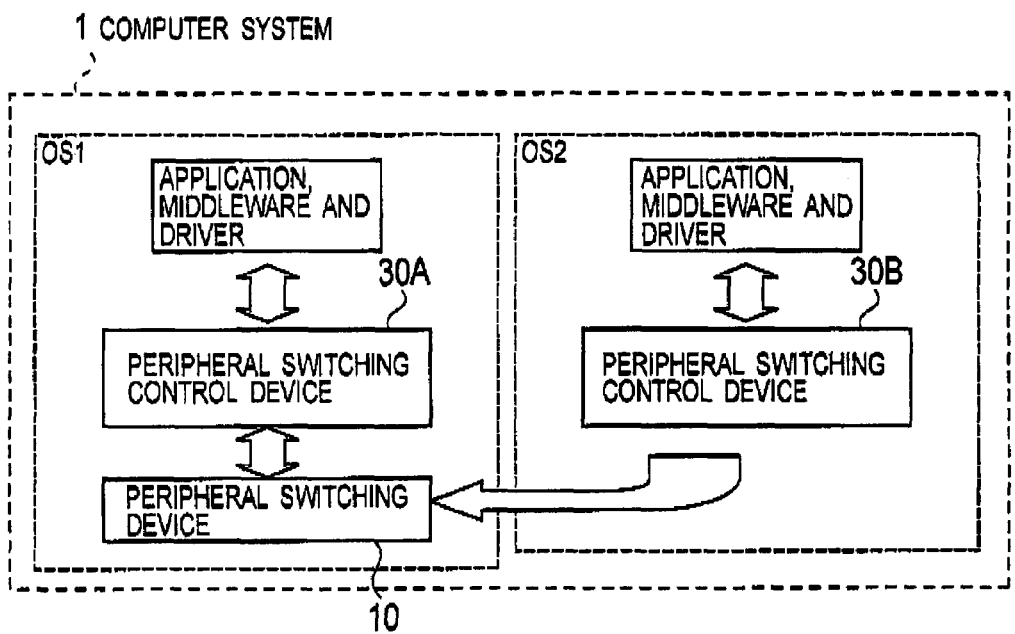
FIG. 2 is a configuration diagram of the computer system according to the first embodiment of the present invention.

Note that the peripheral switching device 10 may be provided on any of the OS1 and the OS2 as shown in FIG. 2.

Here, when the peripheral switching device 10 is provided on the OS1, as in the case with the above configuration, the real device driver used for accessing the actual peripheral is provided on the OS1, and the virtual device drivers are provided on the OS1 and the OS2.

The peripheral switching device 10 controls the ownership of the peripheral to the OS1 or the OS2 by switching the connection with the real device driver between the virtual device drivers.

In addition, the peripheral switching control devices 30A and 30B and the peripheral switching device 10 may be each implemented as a program such as a device driver contained in an OS or may be implemented as an application.

Instead, the peripheral switching control devices 30A and 30B and the peripheral switching device 10 may be each implemented by dividing the functions thereof into multiple device drivers and applications.

Figures 3, 4:
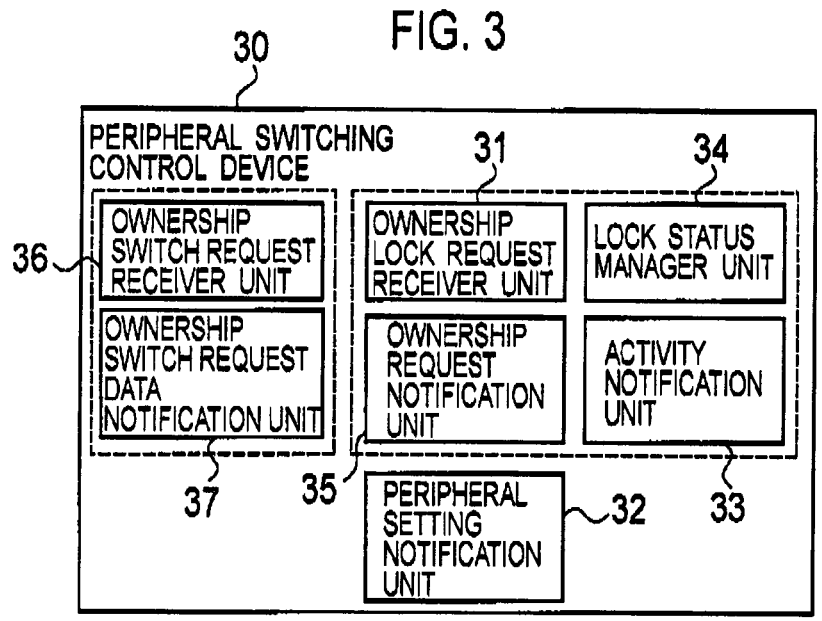
FIG. 3 shows functional block diagrams of a peripheral switching control device and a peripheral switching device mounted in a computer system according to the first embodiment of the present invention.
FIG. 4 is a diagram showing an example of a lock management table managed by an ownership request holding unit of the peripheral switching device according to the first embodiment of the present invention.

As shown in FIG. 3, the peripheral switching device 10 includes an ownership switch request receiver unit 11, an ownership request holding unit 12, a switching judgment unit 13, a peripheral setting unit 14 and a switching execution unit 15.

The ownership switch request receiver unit 11 is configured to receive an ownership switch request for requesting to assign a peripheral to an OS, i.e., an ownership switch request for requesting to assign a peripheral to the designated OS or the background OS.

The ownership switch request may contain the designation of a peripheral type requested to be assigned to an OS, or contain the priority given to the request. In addition, the ownership switch request may also contain status information indicating a type and a reason of the ownership switch request.

Moreover, the priority contained in the ownership switch request may be determined in accordance with a status of software in the OS.

In addition, it maybe determined to use a default setting, in a case where the ownership switch request does not designate any OS, any peripheral type or the priority.

For example, the default setting may be set as follows. Firstly, "the background OS" is set as a default OS to which peripherals are to be assigned by switching. In addition, "an LCD and a keypad" are set as default peripheral types, and a default priority is set to "2".

When a user presses a switch button, for example, it is necessary to switch the OS currently operating as the background OS to foreground OS. Accordingly, the ownership switch request is configured to be transmitted from the driver of the keypad.

Furthermore, when there is an incoming call to a telephone application on the background OS, the background OS needs to shift to foreground OS. Accordingly, the ownership switch request is configured to be transmitted by the telephone application or the device driver.

The ownership request holding unit 12 is configured to receive and hold an ownership request for requesting to ensure or release an ownership of a peripheral to an OS (that is, an ownership request for requesting to prohibit switching in order to fix the ownership of the peripheral of a designated peripheral type to a designated OS, or to release the prohibition).

Here, the ownership request may contain the priority, and identification on a requesting source OS. Moreover, the ownership request may also contain status information indicating a type and a reason of the ownership request.

Moreover, the priority contained in the ownership request may be determined in accordance with a status of software in the OS.

In addition, the ownership request holding unit 12 may be configured to replace a currently held ownership request with a newly received ownership request upon receipt of the new ownership request containing a higher priority than that in the currently held ownership request.

The ownership request holding unit 12 may be configured to check a held ownership request and to delete the ownership request if the ownership request has been held over a certain time period after the reception or update of the ownership request.

For example, the ownership request holding unit 12 can hold, as a timestamp, a time of receiving an ownership request and thereby judge whether or not the fixed time elapses after the ownership request is received.

Moreover, the ownership request holding unit 12 may be configured to hold an ownership request by using a lock management table shown in FIG. 4. In the example shown in FIG. 4, the microphone, which is a peripheral, is set to be surely assigned to the OS1.

FIG. 5A shows a specific example of a format of the ownership request. As shown in FIG. 5A, the ownership request is composed of a "peripheral switching prohibition bit string" and a "lock request priority string".

For example, as shown in FIG. 5B, the peripheral switching prohibition bit string is composed of one bite, and is configured to assign a peripheral type to each bit. The peripheral switching prohibition bit string is configured to designate to ensure the ownership of the peripheral which type is corresponding to the bit "1" to an OS (a requesting source OS that transmits the ownership request).

The lock request priority string is composed of bits corresponding to the respective bits of the peripheral switching prohibition bit string, and is composed to be assigned one of four priority levels 1 to 4.

The ownership request holding unit 12 is assumed to be able to identify a requesting source OS of an ownership request when receiving the ownership request. For this reason, the ownership request shown in FIG. 5A does not state an OS identification explicitly.

As described above, the ownership request holding unit 12 is configured to receive the ownership request as a request to fix the ownership of the peripheral of a peripheral type designated by the requesting source OS.

The switching judgment unit 13 is configured to judge whether or not to execute an assignment of a peripheral to the OS in response to the aforementioned ownership switch request and ownership request.

When an ownership request held in the ownership request holding unit 12 is replaced with a newly received ownership request, the switching judgment unit 13 may configured to judge whether or not to execute the assignment of a peripheral to an OS designated by the newly held ownership request after the replacement.

In addition, the switching judgment unit 13 may be configured to judge whether or not to execute the assignment of a peripheral to an OS designated by the ownership switch request, in accordance with the priority given to the ownership request.

Further, the switching judgment unit 13 may be configured to judge whether or not to execute the assignment of a peripheral to an OS designated by the ownership switch request, in accordance with the priority given to the ownership switch request.

Furthermore, the switching judgment unit 13 may be configured to judge whether or not to execute the assignment of a peripheral to an OS designated by the ownership switch request, in accordance with the status information contained in the ownership switch request and the ownership request.

An example of the status information contained in the ownership switch request is "incoming telephone call", and an example of the status information contained in the ownership request is "music playback".

The switching judgment unit 13 may be configured to have a policy of giving priority to "incoming telephone call" over "music playback", and to judge whether or not to execute the assignment of a peripheral to an OS designated by the ownership switch request in accordance with the policy.

Moreover, the switching judgment unit 13 may be configured to judge whether or not to execute the assignment of a peripheral to an OS designated by the ownership switch request, in accordance with a query result from a user.

For instance, the switching judgment unit 13 may be configured to manage judgment results indicating whether or not to execute the assignment of a peripheral to an OS designated by the ownership switch request, by using a peripheral assignment table shown in FIGS. 6A and 6B.

With reference to FIGS. 6A and 6B, descriptions will be given below for a method of managing judgment results by using the peripheral assignment table.

First, all the peripherals are assigned to the OS1 operating as the foreground OS (see the left tables in FIGS. 6A and 6B).

Second, when a user presses the switch button, the ownership switch request receiver unit 11 receives an ownership switch request to assign the peripherals to the OS2 operating as the background OS.

Here, it the ownership request holding unit 12 does not hold any ownership request, the switching judgment unit 13 assigns all the peripherals to the OS2 (see the right table in FIG. 6A).

In contrast, if the ownership request holding unit 12 holds an ownership request to ensure the ownership of the microphone to the OS1 (that is, an ownership request to prohibit the switching of the ownership of the microphone between the OSs), the switching judgment unit 13 assigns all of the peripherals except the microphone to the OS2 while fixing the ownership of the microphone to the OS1 (see the right table in FIG. 6B).

When the setting of a peripheral assigned to an OS is changed from the on-setting to the off-setting or from the off-setting to the on-setting, the peripheral setting unit 14 is configured to detect the change, and to notify the setting information of the peripheral to the OS to which the peripheral is assigned.

In this embodiment, the peripheral setting unit 14 is configured to notify the setting information to the peripheral switching control device 30 on the OS to which the peripheral is assigned.

The peripheral switching control device 30 can detect a change in the on-off setting, for instance, by inspecting a change in the setting information of the peripherals or by performing periodical polling.

For example, when the OS makes setting to mute the volume of the speaker shared by the OS1 and the OS2, the peripheral setting unit 14 notifies the OS2 that the speaker has been set to off, in order to stop the OS2 from outputting audio data.

The switching execution unit 15 is configured to execute the switching of the ownership of the peripheral between the OSs, in accordance with the judgment result of the switching judgment unit 13. Note that the switching execution unit 15 may be configured to change the setting of each driver, in accordance with the setting specific to each OS.

As shown in FIG. 3, the peripheral switching control device 30 includes an ownership lock request receiver unit 31, a peripheral setting notification unit 32, an activity notification unit 33, a lock status manager unit 34, an ownership request notification unit 35, an ownership switch request receiver unit 36 and a switch request data notification unit 37.

The ownership lock request receiver unit 31 is configured to receive an ownership lock request containing at least one of: a request to prohibit the switching of an ownership of a peripheral between OSs or to release the prohibition; the priority given to the request; and status information explaining the request.

Incidentally, the ownership lock request may contain the status information indicating a type and a reason of the ownership lock request or may contain identification of the requesting source such as a process ID or a thread ID. Here, the requesting source of the ownership lock request may be any of an OS, a driver, an application, middleware and the like.

The ownership lock request receiver unit 31 may be configured to receive the ownership lock request by using certain communication means such as an API (Application Programming Interface) function call or a message passing.

FIG. 7 shows a specific example of a format of the ownership lock request. As shown in FIG. 7, the ownership lock request is composed of a "peripheral switching prohibition bit string" and a "lock request priority string" as similar to the ownership request.

The peripheral setting notification unit 32 is configured to receive the setting information of a peripheral notified by the peripheral switching device 10, and to control whether or not to allow the OS corresponding to this peripheral switching control device 30 to perform input-output operations to the peripheral.

More precisely, the peripheral setting notification unit 32 makes a control such that the virtual device driver corresponding to the peripheral would not output data to the real device driver.

The activity notification unit 33 is configured to notify the peripheral switching device 10 that the peripheral switching control device 30 normally operates, in certain periods.

Specifically, the activity notification unit 33 is configured to notify that the peripheral switching control device 30 normally operates, by transmitting update information such as an incremented counter or time information (timestamp).

The peripheral switching device 10 can judge that a fault occurs in the peripheral switching control device 30, in a case where the counter does not count up for a certain fixed time or where the time information is an old one.

The lock status manager unit 34 is configured to manage lock statuses (records) each having a prohibition status and a timestamp associated with each other. Here, the prohibition status indicates that the switching of the ownership of the peripheral between the OSs is prohibited, and the timestamp indicates a time at which the prohibition status is set. Moreover, the lock status manager unit 34 is configured to update the lock status in response to the ownership lock request received by the ownership lock request receiver unit 31, and to invalidate a lock status having been held over a certain time period.

As the lock status, the lock status manager unit 34 may hold the identification of a requesting source of an ownership lock request for requesting to prohibit the switching of the ownership of the peripheral between the OSs, the priority given to the request and the status information of the request, in addition to the timestamp and the prohibition status indicating that the switching of the ownership for each peripheral between the OSs is prohibited.

The lock status manager unit 34 may be configured to monitor the operation of the program of the requesting source in reference to the identification of the requesting source of the ownership lock request, and to release the lock related to the ownership lock request if the operation is completed.

For example, the lock status manager unit 34 is configured to store to associate identification of a requesting source of an ownership lock request which causes a peripheral to be in the lock status; the priority given to the ownership lock request; the peripheral type specifying the peripheral to be targeted; and the timestamp indicating a time of updating the lock status, in association with each other by using a lock status management table shown in FIG. 8.

The ownership request notification unit 35 is configured to notify, to the peripheral switching device 10, ownership requests for requesting to ensure or release the ownership of a peripheral to an OS, in accordance with the lock statuses managed by the lock status manager unit 34, in certain periods.

More precisely, the ownership request notification unit 35 is configured to notify, to the peripheral switching device 10, an ownership request containing: a request to ensure or release the ownership of a designated type of peripheral to a designated OS; and the priority given to the request (or instead, the priority corresponding to the status information).

Here, the ownership request may contain the status information, the OS identification, and the timestamp indicating the current time.

As for the priority corresponding to the status information, the ownership request notification unit 35 can designate "3" as the priority of a status during the operation for a telephone call, and designate "2" as the priority of a status during the operation for music playback.

The ownership request notification unit 35 is configured to notify the ownership request, for example, by writing to an area shared by the peripheral switching device 10 and the peripheral switching control device 30 through a certain function call, or by using a communication channel between itself and the peripheral switching device 10.

For instance, the ownership request notification unit 35 can use a call of a function "Peripheral_Switch_Control (peripheral, osid, priority, timestamp)".

Here, the "peripheral" designates a peripheral switching prohibition bit string, the "osid" designates the OS identification, the "priority" designates the priority string for the ownership lock request, and the "timestamp" designates a timestamp (a time of transmitting the ownership request).

Moreover, the peripheral switching device 10 can execute the switching of the ownership of the peripheral between the OSs in order of appropriate priority, even when the ownership request notification unit 35 only designates the status information without giving explicit priority to the ownership request.

The ownership switch request receiver unit 36 is configured to receive the ownership switch request for requesting to assign a peripheral to the OS.

To be more precise, the ownership switch request receiver unit 36 is configured to receive an ownership switch request containing at least one of: a request to assign a designated type of peripheral or all types of peripherals to the OS; the priority given to the request; and event information explaining the request.

The ownership switch request receiver unit 36 is configured to receive the ownership switch request, by using a mode such as a call of a function conforming to the API opened by the peripheral switching control device 30 or a message passing.

The ownership switch request data notification unit 37 is configured to notify the peripheral switching device 10 of the aforementioned ownership switch request.

Specifically, the ownership switch request data notification unit 37 is configured to transmit, to the peripheral switching device 10, the ownership switch request containing: a request to assign a designated type of peripheral or all types of peripherals to the OS; and the priority given to the request (or the priority corresponding to the event information). In addition, the ownership switch request may contain the identification of the OS to be assigned the peripheral by switching.

The peripheral switching device 10 can execute the switching of the ownership of the peripheral between the OSs in order of appropriate priority, even when the ownership switch request data notification unit 37 only designates the event information without giving explicit priority to the ownership request.

Operation of Computer System According to First Embodiment of the Invention

Hereinafter, operations of the computer system 1 according to this embodiment will be described by referring to FIGS. 9 to 13.

Firstly, with reference to FIG. 9, descriptions will be given for a peripheral switching locking procedure in the peripheral switching control device 30 of the computer system 1 according to this embodiment.

Figure 9:
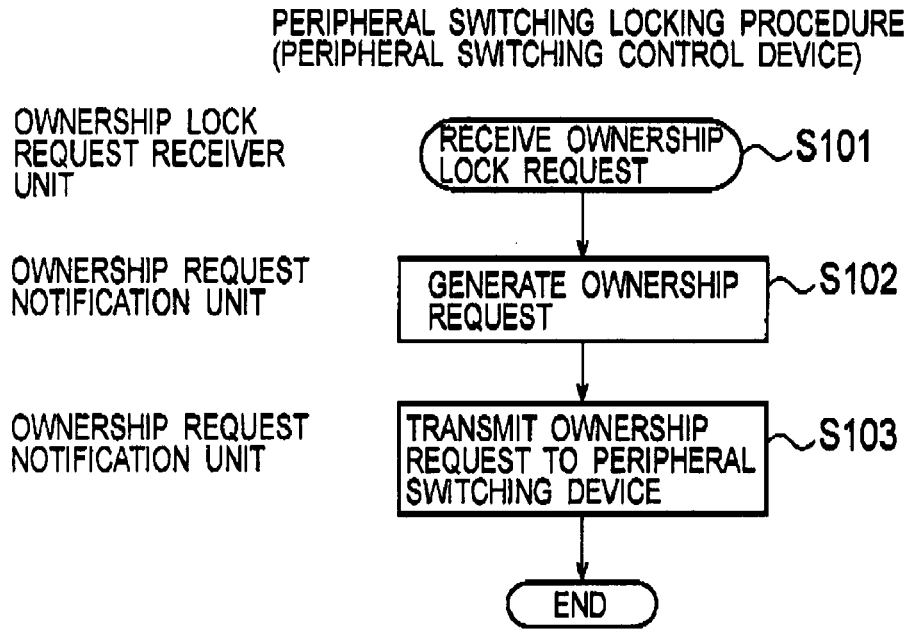
FIG. 9 is a flow chart showing a peripheral switching locking procedure in the peripheral switching control device according to the first embodiment of the present invention.

As shown in FIG. 9, in step S101, the ownership lock request receiver unit 31 receives an ownership lock request, which designates the peripheral type and the priority, from an application, middleware or a device driver.

The ownership request notification unit 35 generates an ownership request containing the peripheral type and the priority in step S102, and notifies the generated ownership request to the peripheral switching device 10 in step S103.

For example, from a telephone application on the OS1, the ownership lock request receiver unit 31 receives an ownership lock request, with the priority level, 1 for requesting to prohibit (lock) the switching of the ownership of the microphone between the OSs. Then, the ownership request notification unit 35 notifies an ownership request (microphone, 1) to the peripheral switching device 10.

Secondly, with reference to FIG. 10, descriptions will be given for a peripheral switching locking procedure in the peripheral switching device 10 of the computer system 1 according to this embodiment.

Figure 10:
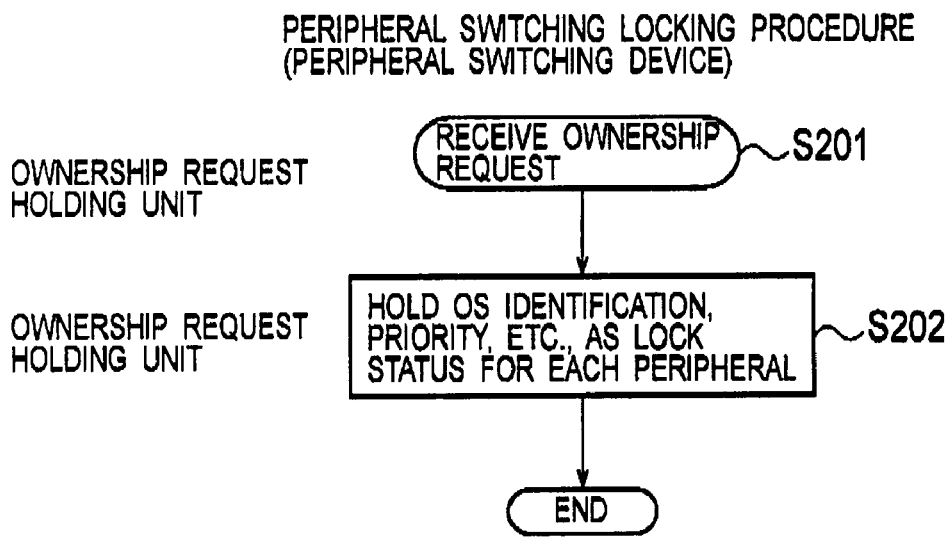
FIG. 10 is a flow chart showing a peripheral switching locking procedure in the peripheral switching control device according to the first embodiment of the present invention.

As shown in FIG. 10, the ownership request holding unit 12 receives the aforementioned ownership request from the peripheral switching control device 30 in step S201, and holds the OS identification, the priority and the timestamp for each peripheral in association with each other, as the lock management table in step S202.

Here, when multiple ownership requests related to the same peripheral type are received, the ownership request holding unit 12 overwrites the lock management table so as to leave the information instructed by the ownership request having the highest priority.

In addition, when multiple ownership requests related to the same peripheral type are received, the ownership request holding unit 12 may call the switching judgment unit 13 after replacing the held ownership request with the ownership request having the higher priority than that of the held ownership request.

At this time, the switching judgment unit 13 judges whether or not to execute the assignment of the peripheral to the OS designated by the received ownership request.

In an example shown in FIG. 4, the ownership request holding unit 12 receives the ownership request (microphone, 1) at a time T1, and thereby updates the lock management table in accordance with a switch prohibition data.

As an example of information replacement caused by an ownership request having the higher priority, there is a possible case where the ownership request holding unit 12 replaces an ownership request "A" with an ownership request "B", when receiving the ownership request "B" having a priority level of "3" to ensure the ownership of the microphone to the OS2 while holding the ownership request "A" having a priority level of "1" to ensure the ownership of the microphone to the OS1.

Thirdly, with reference to FIGS. 11 and 12, descriptions will be given for a peripheral switching procedure in the peripheral switching device 10 of the computer system 1 according to this embodiment.

Figure 11:
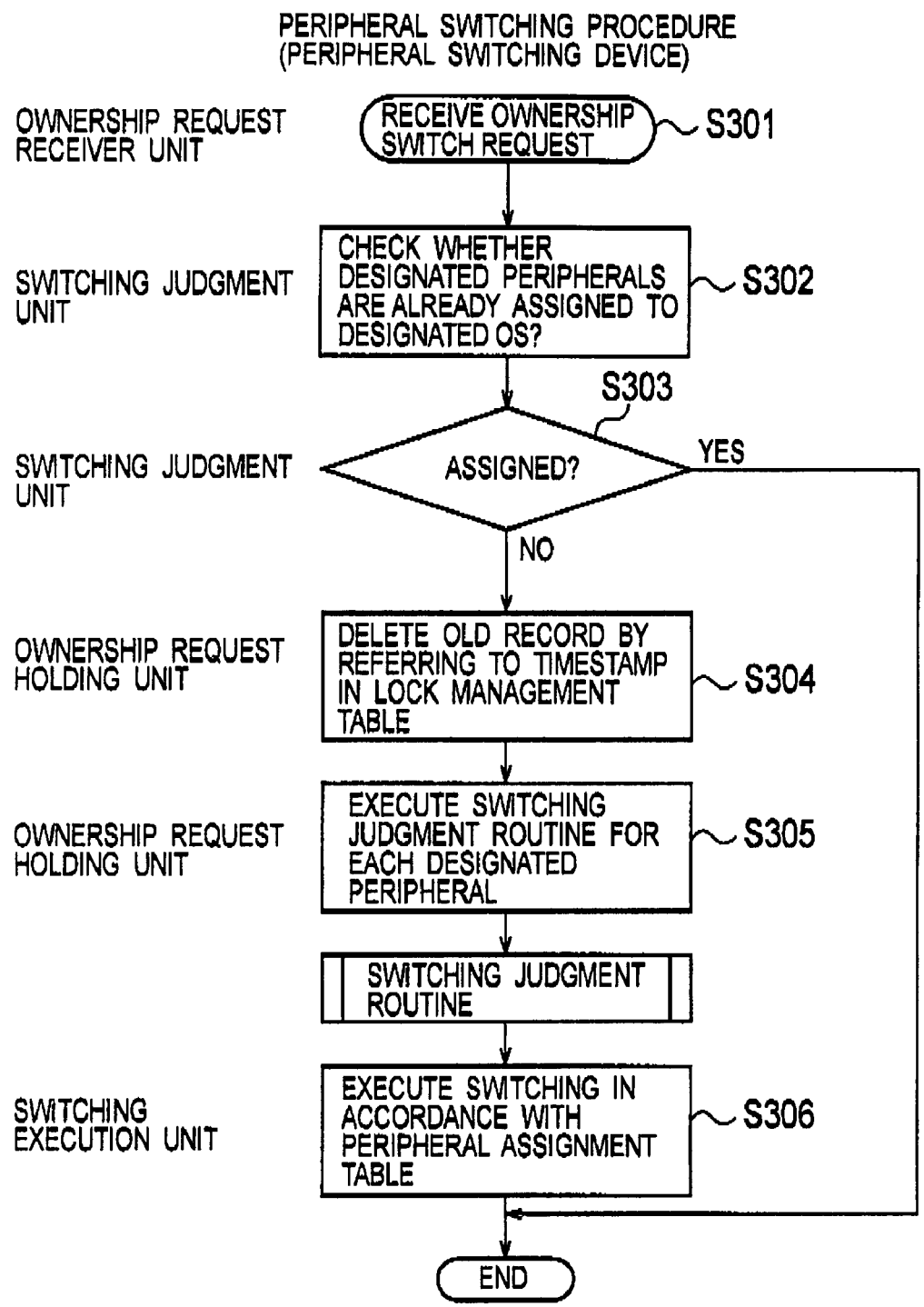
FIG. 11 is a flow chart showing a peripheral switching procedure in the peripheral switching device according to the first embodiment of the present invention.

An example shown in FIG. 11 is based on the assumption that a user presses the switch button to notify an ownership switch request having a priority level of "2" for requesting to assign peripherals such as the LCD, keypad, speaker and microphone to the OS2 operating as the background OS, under conditions where the OS1 operates as the foreground OS and where all the peripherals are assigned to the OS1 (see left table in FIG. 6B).

As shown in FIG. 11, in step S301, the ownership switch request receiver unit 11 receives and interprets the above ownership switch request.

In step S302, by making reference to the peripheral assignment table based on the received ownership switch request, the switching judgment unit 13 judges whether or not each of the peripherals (the LCD, keypad, speaker and microphone) designated by the ownership switch request is already assigned to the OS (OS2) designated by the ownership switch request.

If the switching judgment unit 13 judges all the peripherals to be already assigned, in step S303, this procedure is terminated. Note that, in the example of FIG. 11, since the peripherals (the LCD, keypad, speaker and microphone) are assigned to the OS1, the switching judgment unit 13 judges all the peripherals not to be assigned yet.

In contrast, if the switching judgment unit 13 judges all the peripherals not to be assigned yet, in step S303, the ownership request holding unit 12 deletes old time-out lock statuses (records) by referring to the timestamps in the lock management table.

In step S305, the ownership request holding unit 12 executes a switching judgment routine, which will be described below, for each of the peripherals (the LCD, keypad, speaker and microphone) of the designated peripheral types by referring the lock management table, and thereby updates the peripheral assignment table.

In step S306, the switching execution unit 15 actually executes the switching of the ownership of the peripheral between the OSs, in accordance with the peripheral assignment table.

Here, the foregoing switching judgment routine will be explained with reference to FIG. 12.

Figure 12:
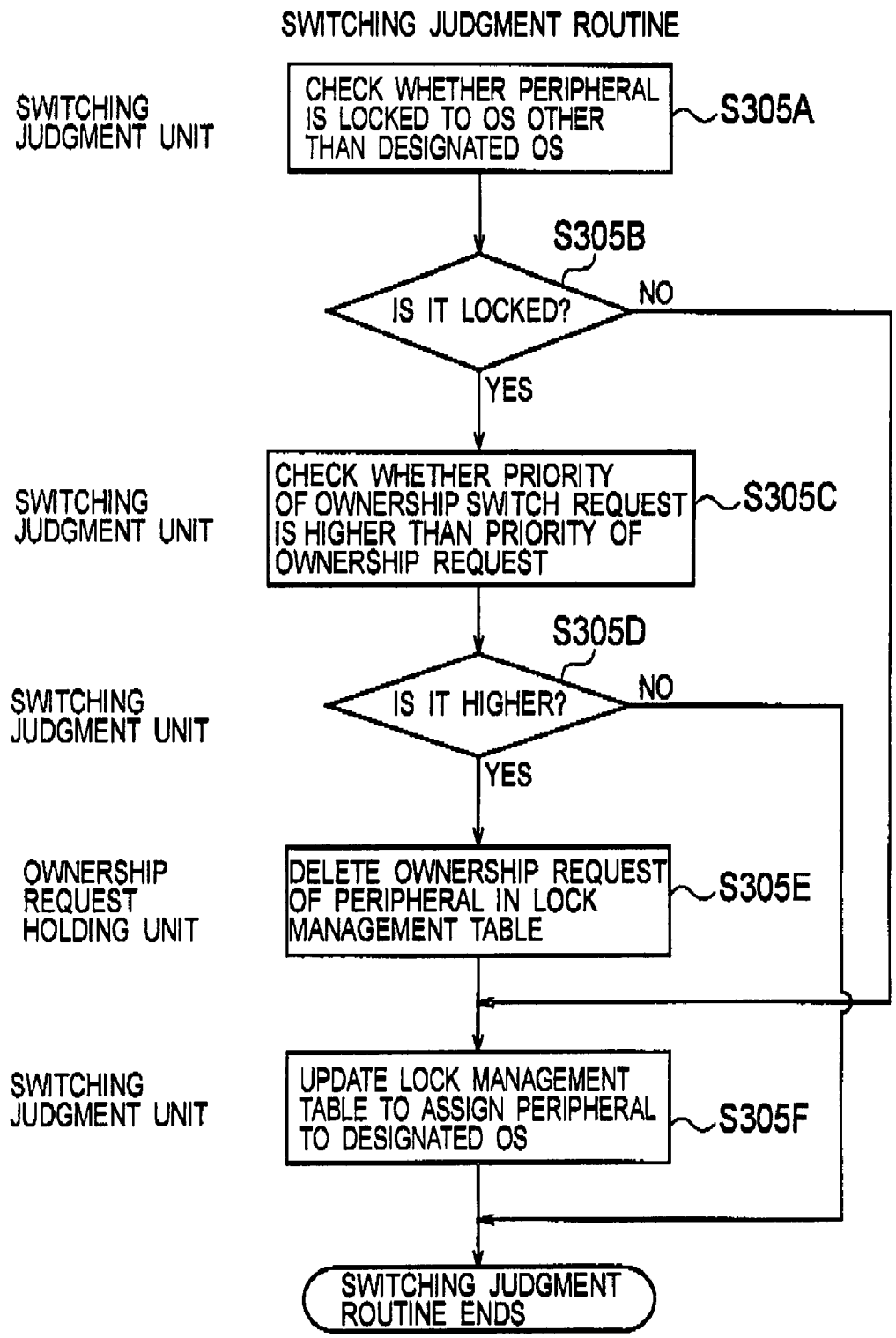
FIG. 12 is a flow chart showing a switching judgment routine executed during the peripheral switching procedure in the peripheral switching device according to the first embodiment of the present invention.

As shown in FIG. 12, in step S305A, the switching judgment unit 13 checks, by referring to the lock management table, whether or not each peripheral is locked to an OS other than the OS designated by the received ownership switch request. In other words, the switching judgment unit 13 checks whether or not to prohibit to switch the ownership of each peripheral to the designated OS. In the above example, since the LCD, keypad and speaker are not locked to the OS2, the judgment results about these peripherals are "NO".

When judging the peripherals not to be locked in step S305B, the switching judgment unit 13 updates the peripheral assignment table such that the peripherals (the LCD, keypad and speaker) of the peripheral types would be assigned to the designated OS, and then terminates the switching judgment routine.

In contrast, when judging the peripherals to be locked, the switching judgment unit 13 checks whether or not the priority of the ownership switch request is higher than that of the ownership request prohibiting to switch the ownership of peripherals to the OS.

If the priority of the ownership switch request is judged to be higher in step S305D, the ownership request holding unit 12 deletes the ownership request from the lock management table in step S305E.

After that, in step S305F, the switching judgment unit 13 updates the peripheral assignment table such that the peripherals would be assigned to the designated OS, and then terminates the switching judgment routine.

In contrast, if the priority of the ownership switch request is judged to be lower in step S305D, the switching judgment unit 13 terminates the switching judgment routine without updating the peripheral assignment table.

In the above example, the microphone is locked to the OS1 that is a different OS from the designated OS2. Accordingly, the switching judgment unit 13 compares the priority level of "2" of the ownership switch request with the priority level of "1" of the ownership request, and does not switch (change) the ownership of the microphone from the OS1, since the priority of the ownership request is higher. Thereby, the ownership of the microphone to the OS1 is fixed, while only the LCD, keypad, speaker, WiFi and camera are assigned to the OS2 (see right table in FIG. 6B).

As a modified example of the switching judgment unit 13, descriptions will be provided for operations of a switching judgment routine at a time when the ownership request holding unit 12 replaces a previously-held ownership request "A" with a new ownership request "B" designating the same peripheral type, upon receipt of the new ownership request "B", since the priority contained in the new ownership request "B" is higher than that contained in the ownership request "A".

If the ownership of the peripheral to the OS designated by the ownership request "B" has not been executed yet, the switching judgment unit 13 executes the assignment of the peripheral to the OS.

More precisely, the ownership request holding unit 12 receives the ownership request "B" with the priority level of "3" to ensure the ownership of the microphone to the OS2, while holding the ownership request "A" with the priority level of "1" to ensure the ownership of the microphone to the OS1. In this case, the switching judgment unit 13 assigns the microphone to the OS2, if the microphone is not yet assigned to the OS2.

Fourthly, with reference to FIG. 13, descriptions will be given for a procedure of making a control for a peripheral shared by the OSs so that, when one of the OSs sets the peripheral to off, the other OS would be stopped from making communications for input-output with the peripheral.

Figure 13:
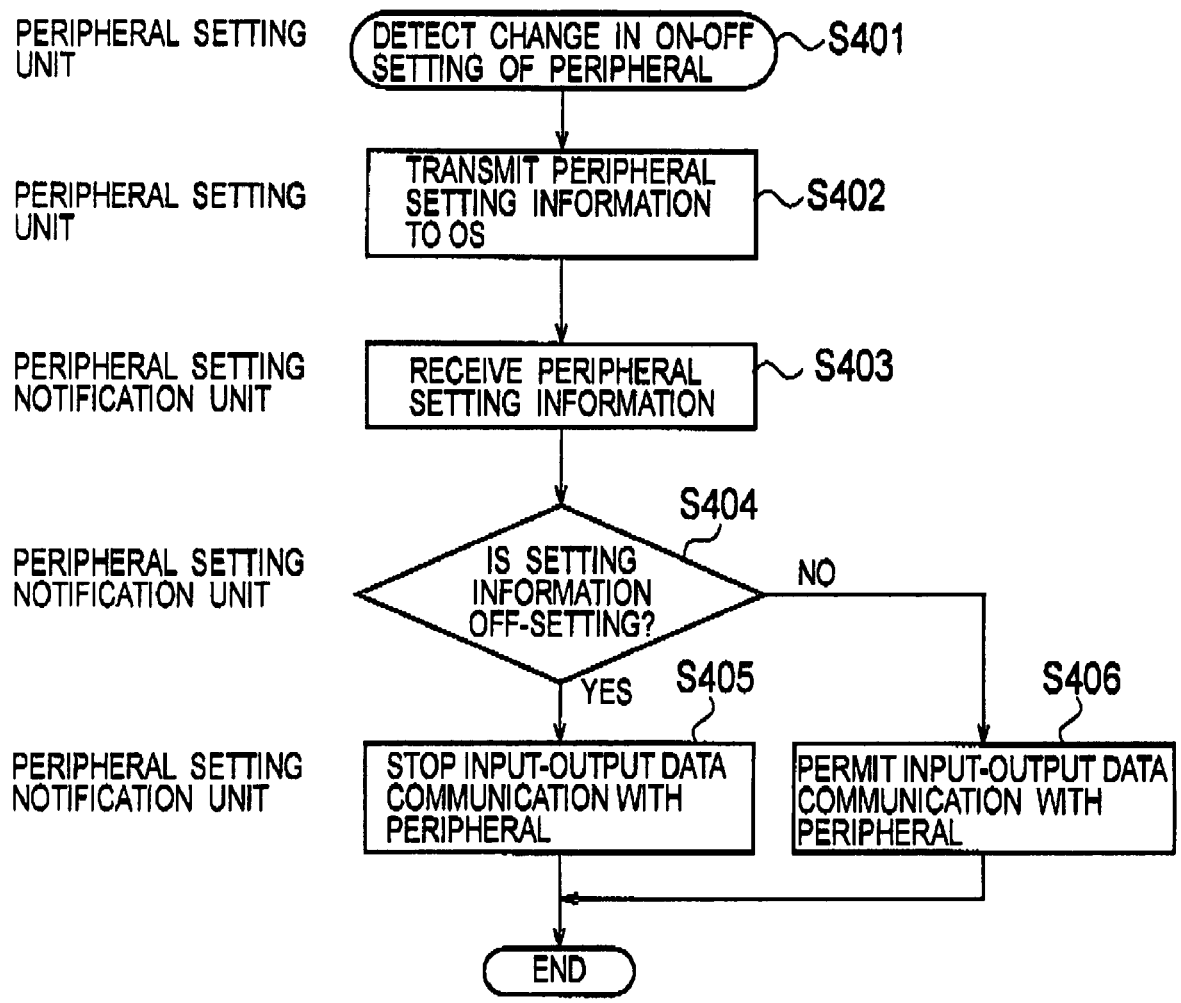
FIG. 13 is a flow chart showing a procedure of controlling input to and output from a peripheral in the peripheral switching device and the switching control device according to the first embodiment of the present invention.

As shown in FIG. 13, in step S401, the peripheral setting unit 14 detects a change in the setting of the peripheral from the on-setting to the off-setting or from the off-setting to the on-setting.

In step S402, the peripheral setting unit 14 notifies the setting information of the peripheral to the OS assigned the peripheral.

In step S403, the peripheral setting notification unit 32 in the peripheral switching control device 30 receives the setting information of the peripheral notified by the peripheral setting unit 14.

In step S404, the peripheral setting notification unit 32 controls whether or not to allow the OS to make communications for input-output with the peripheral, in accordance with the received setting information of the peripheral.

When the setting information of the peripheral indicates that the peripheral is set to off, the peripheral setting notification unit 32 stops the OS from making communications for input-output with the peripheral in step S405.

On the other hand, if the setting information of the peripheral indicates that the peripheral is set to on, the peripheral setting notification unit 32 allows the OS to make communications for input-output with the peripheral in step S406.

Effects and Advantages of Computer System According to First Embodiment of the Invention According to the computer system 1 of this embodiment, even when an ownership switch request for requesting to assign a peripheral to an OS is received from an application or a user, the switching of the ownership of the peripheral designated by the ownership request can be prohibited (locked).

Even when an ownership switch request for requesting to assign peripherals to an OS is received from an application or a user, and if the ownership request containing a higher priority than that contained in the ownership switch request is held, it is possible to prohibit (lock) the switching of the ownership of the peripherals designated by the ownership request.

If the priority contained in the ownership switch request is higher than that contained in the ownership request, it is possible to switch the ownership of the peripherals designated by the ownership request, and thereby to perform flexible and appropriate control of switching of the ownership of the peripheral, in accordance with the request of the application or the user.

Even when one OS ensures an ownership of a specified peripheral, an if another OS transmits an ownership request having a higher priority, it is possible to switch the ownership of the specified peripheral from the one OS to the another OS for ensuring.

According to the computer system 1 of this embodiment, if the priority of the ownership request received from the another OS is lower than that of the previously-held ownership request, it is possible to reject an update of the ownership request and thereby to flexibly and appropriately control a competition in accordance with requests from the application and the like.

With the computer system 1 according to this embodiment, flexible switching control of an ownership of a peripheral can be carried out in accordance with the operation statuses of the application, middleware and device drivers on the operating systems.

According to the computer system 1 of this embodiment, in a peripheral shared between OSs, when one OS sets the peripheral to off, another OS can control so as to stop communications for input-output with the peripheral. When the peripheral is set to on, the another OS can control so as to immediately start the communications.

Even when a requesting source of an ownership lock request fails to release a prohibition (lock) of the switching of the ownership of the peripheral between the OSs due to a fault or the like, it is possible to release the lock after a predetermined time elapses.

In the computer system 1 of this embodiment, the application, middleware and device drivers can issue an ownership lock request designating a peripheral type to the peripheral switching device 10, and thereby the priority depending on an application type or the like can be given to the ownership lock request.

According to the computer system 1 of this embodiment, the peripheral switching device is capable of surely detecting a fault in the peripheral switching control device 30.

Use of the computer system 1 according to this embodiment enables managing ownership lock requests made by multiple lock requesting sources, and switching lock statuses in association with each other. For example, it is possible to prevent an error in releasing the appropriate switching lock in response to an inappropriate ownership lock request. The inappropriate ownership lock request is a request to release the appropriate switching lock, and is made by a requesting source other than the one requesting the appropriate switching lock.

In addition, according to the computer system 1 of this embodiment, it is possible to switch the ownership of peripherals between the OSs and to prohibit (lock) the switching in response to requests made by the applications and depending on the following priorities, and also possible to control communications in accordance with the on/off-setting of the peripherals as follows.

(1) A telephone call is maintained with the microphone locked even when a user switches an OS from foreground OS to background OS during a telephone conversation.

(2) Even when an ownership request to assign the microphone, speaker and the like is received from another OS during a telephone conversation, a telephone call is maintained while the ownership request is rejected in accordance with the priorities.

(3) When the OS1 detects a fault or anomaly of the OS2 in a case where the LCD and keypad are to be assigned to the foreground OS, an application on OS1 issues an ownership switch request having a higher priority and thereby causes the OS1 to be the foreground OS. In this way, the OS1 can display an operation screen for restoring the OS2 while preventing a user from viewing a screen displayed by the OS2 having the fault or anomaly.

Moreover, even when an ownership switch request is received from the OS2, it is possible to maintain the ownership of the peripherals such as the LCD and keypad to OS1, because the OS1 has issued the ownership request with the higher priority to assign the peripherals. Accordingly, the user is prevented from operating on the OS2 having the fault or anomaly, which prevents the expansion of the faulty.

(4) When the OS1 detects a fault or anomaly of the OS2 in a case where the LCD and keypad are assigned independently from the foreground OS, an application on the OS1 issues an ownership request having a higher priority to ensure the ownership of the LCD and keypad to the OS1. In this way, the OS1 can display an operation screen for restoring the OS2 while preventing a user from viewing a screen displayed by the OS2 having the fault or anomaly.

In addition, even when an ownership request to assign the peripherals such as the LCD and keypad is received from the OS2, it is possible to maintain the ownership of the peripherals to the OS1. Accordingly, the user is prevented from operating on the OS2 having the fault or anomaly, which prevents the expansion of the faulty.

(5) In a case where one of the OSs sets the volume of the speaker to off (sets the manner mode and the like) while the other OS is operating for music playback, the other OS is stopped from outputting audio data to the speaker, thereby avoiding wasteful resource consumption.

MODIFIED EXAMPLE 1

By referring to FIGS. 14 and 15, a modified example 1 of the computer system 1 according to this embodiment will be described. This modified example 1 includes a peripheral switching locking procedure modified from the basic procedure shown in FIGS. 9 and 10 for the purpose of improving fault tolerance.

By referring to FIGS. 14 and 15, descriptions will be given below for the peripheral switching locking procedure in the peripheral switching control device 30 of the computer system 1 according to the modified example 1.

Figure 14:
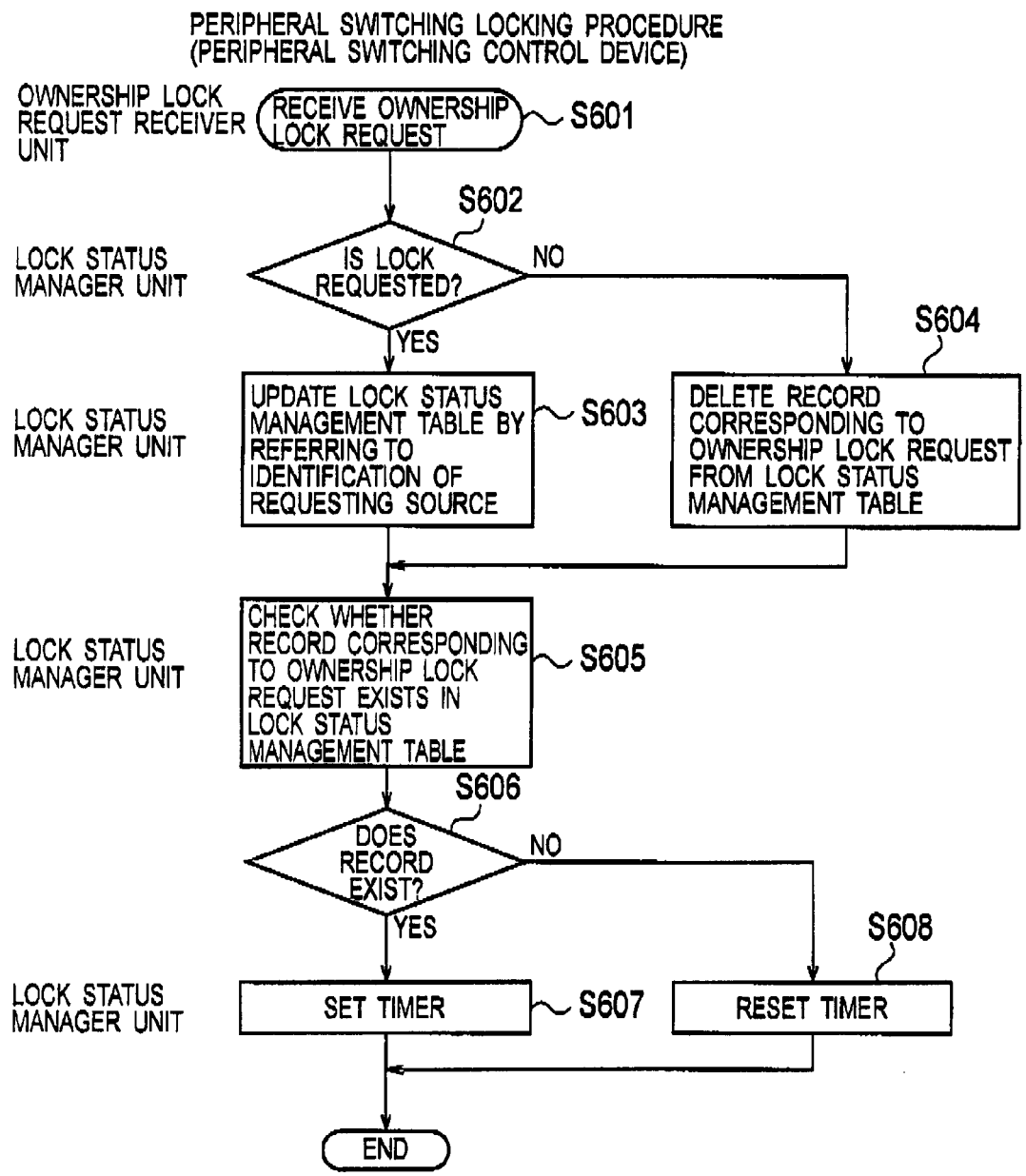
FIG. 14 is a flow chart showing a peripheral switching locking procedure in a peripheral switching control device according to a modified example 1 of the present invention.

As shown in FIG. 14, in step S601, the ownership lock request receiver unit 31 receives an ownership lock request designating a peripheral type and the priority from the application, middleware or device driver.

For instance, here, assume that the ownership lock request receiver unit 31 receives an ownership lock request at a time T1 from a music playback application (the process ID=ID1), and that the ownership lock request is a request having a priority level of "3" for requesting to prohibit (lock) the switching of ownership of the speaker from the OS2.

If the lock status manager unit 34 judges that the received request switching lock is one to request a release of the lock by referring to the received ownership lock request in step S602, the lock status manager unit 34 deletes, from the lock status management table, the lock status (record) corresponding to the requesting source of the ownership lock request with the identification used as a key.

On the other hand, if the lock status manager unit 34 judges that the received request switching lock is one to request a lock by referring to the received ownership lock request in step S602, the lock status manager unit 34 updates the lock status management table by using, as a key, the identification of the requesting source of the ownership lock request.

In the above example, as shown in the lock status management table in FIG. 8, a record (ID1, 3, speaker, T1) is added, in a format of (identification of requesting source, priority, peripheral type, timestamp).

Incidentally, when a new ownership lock request for requesting to release the lock of the speaker is received from the same application, the record (ID1, 3, speaker, T1) is deleted, since the process ID contained in the new ownership lock request is "ID1". Thus, the consistency of the lock status management table is maintained.

In contrast, when a new ownership lock request for requesting to release the lock of the speaker is received from a process having the process ID of "ID4", the record (ID1, 3, speaker, T1) is not deleted but maintained. Thus, the speaker is kept locked.

In step S605, the lock status manager unit 34 checks whether or not there is a record corresponding to the received ownership lock request with reference to the lock status management table.

If it is judged that such a record exists in step S606, the lock status manager unit 34 sets a timer in step S607, in order to perform a periodical startup of the peripheral switching control device 30.

On the other hand, if it is judged that such a record does not exist, the lock status manager unit 34 resets the timer used for the periodical startup in step S608.

In the above example, a record corresponding to the received ownership lock request exists in the lock status management table. Accordingly, the timer is set.

As shown in FIG. 15, the timer causes the peripheral switching control device 30 to start up in step S701.

In step S702, at the time of startup by the timer, the ownership request notification unit 35 is called and then generates an ownership request by referring to the lock status management table.

In step S703, the ownership request notification unit 35 notifies the generated ownership request to the peripheral switching device 10.

In other words, the timer causes the peripheral switching control device 30 to periodically notify ownership requests to the peripheral switching device 10, and the peripheral switching device 10 can confirm that the peripheral switching control device 30 operates without causing an abnormal end.

In step S704, the lock status manager unit 34 deletes old records in the lock status management table, by referring to a timestamp of each of the records stored therein.

In step S705, the lock status manager unit 34 checks whether or not there is a remaining record in the lock status management table.

If there is a record, the lock status manager unit 34 sets the timer in step S706, in order to periodically start up the peripheral switching control device 30.

In contrast, if all records are deleted, the lock status manager unit 34 resets the timer in step S707.

According to the present invention, it is possible to provide a peripheral switching device and a peripheral switching control device capable of implementing a means for prohibiting (locking) switching of an ownership of a certain peripheral between OSs for ensuring, and a means for flexibly solving a competition for a peripheral between the OSs.

Moreover, according to the present invention, it is possible to provide a peripheral switching device and a peripheral switching control device capable of implementing a means for controlling so that, when a peripheral shared by OSs is set to off by one of the OSs, the other OS would be stopped from making communications for input-output with the peripheral.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A peripheral switching device configured to switch an ownership of a peripheral between a plurality of operating systems that concurrently operate in a computer system, comprising:
    an ownership switch request receiver unit configured to receive an ownership switch request for requesting to assign a peripheral to an operating system;
    an ownership request holding unit configured to receive and hold an ownership request for requesting to ensure or release an ownership of a peripheral to an operating system;
    a switching judgment unit configured to judge whether or not to execute an assignment of a peripheral to an operating system, in accordance with the ownership switch request and the ownership request; and
    a switching execution unit configured to execute the assignment of the peripheral to the operating system, in accordance with the judgment result.

2. The peripheral switching device according to claim 1, wherein
    the switching judgment unit is configured to judge whether or not to execute the assignment of the peripheral to the operating system designated by the ownership switch request, in accordance with a priority included in at least any one of the ownership switch request and the ownership request.

3. The peripheral switching device according to claim 1, wherein the ownership request holding unit is configured to replace the held ownership request with a new ownership request including a higher priority than a priority included in the held ownership request, when the new ownership request is received, and the switching judgment unit is configured to judge whether or not to execute the assignment of the peripheral to the operating system designated by the new ownership request, when the held ownership request is replaced with the new ownership request.

4. The peripheral switching device according to claim 2, wherein the priority of any of the ownership switch request and the ownership request is determined in accordance with a status of software on the operating system.

5. The peripheral switching device according to claim 1, further comprising a peripheral setting unit configured to notify setting information of a peripheral to an operating systems to which the peripheral is assigned, when a setting of the peripheral is changed from an on-setting to an off-setting or from the off-setting to the on-setting.

6. The peripheral switching device according to claim 1, wherein the ownership request holding unit is configured to delete the ownership request which has been held over a predetermined time period after the ownership request was received or updated.

7. The peripheral switching device according to claim 1, wherein the switching judgment unit is configured to judge whether or not to execute the assignment of the peripheral to the operating system designated by the ownership switch request, in accordance with the status information included in the ownership request and the status information included in the ownership switch request.

8. A peripheral switching control device provided for each of a plurality of operating systems in a computer system comprising a peripheral switching device configured to switch an ownership of a peripheral between the plurality of operating systems that concurrently operate, comprising:

an ownership lock request receiver unit configured to receive an ownership lock request including a request to prohibit switching of an ownership of a peripheral between the operating systems or to release the prohibition, and a priority given to the request; and an ownership request notification unit configured to notify, to the peripheral switching device, an ownership request including a request to ensure or release the ownership of the peripheral to the operating system, and a priority given to the request, based on the received ownership lock request.

9. The peripheral switching control device according to claim 8, further comprising a peripheral setting notification unit configured to receive setting information of a peripheral transmitted by the peripheral switching device, and to determine the permission or restriction of an input-output operation of the operating system under the control of the peripheral switching control device to the peripheral based on the setting information.

10. The peripheral switching control device according to claim 8, further comprising:

an ownership switch request receiver unit configured to receive an ownership switch request for requesting to assign a peripheral to an operating system; and an ownership switch request data notification unit configured to notify the ownership switch request to the peripheral switching device.

11. The peripheral switching control device according to claim 8, further comprising:

a lock status manager unit configured to manage a lock status including a prohibition status in which switching of an ownership of a peripheral between the operating systems is prohibited, and a timestamp indicating a time when the prohibition status is set, to update the lock status in response to the ownership lock request, and to invalidate the prohibition status which has been held over a predetermined time period; and an ownership request notification unit configured to notify an ownership request for requesting to ensure or release the ownership of the peripheral to the operating system, to the peripheral switching device, in accordance with the lock status, in a certain periods.

12. The peripheral switching control device according to claim 8, further comprising an activity notification unit configured to notify the peripheral switching device that the peripheral switching control device normally operates, in certain periods.

13. The peripheral switching control device according to claim 11, wherein the lock status manager unit is configured to further include, as the lock status of each peripheral, identification of a requesting source which issues the ownership lock request for requesting to prohibit switching of the ownership of the peripheral between the operating systems, in addition to the prohibition status and the timestamp.

* * * * *